United States Patent [19]
Havenhill et al.

[11] Patent Number: 4,834,207
[45] Date of Patent: May 30, 1989

[54] VEHICLE THEFT-PREVENTION SYSTEM

[75] Inventors: Max L. Havenhill; James B. Sharp, both of Irving; Larry W. Nichter, Dallas, all of Tex.

[73] Assignee: HNS Products, Inc., Irving, Tex.

[21] Appl. No.: 105,007

[22] Filed: Oct. 6, 1987

[51] Int. Cl.$^4$ ............................................. B60R 25/10
[52] U.S. Cl. ...................................... 180/287; 180/289
[58] Field of Search ................................. 180/287, 289

[56] References Cited

U.S. PATENT DOCUMENTS

| | | | |
|---|---|---|---|
| 2,695,685 | 11/1954 | Jamison | 180/287 |
| 2,826,390 | 3/1958 | Bailey | 188/353 |
| 4,196,939 | 4/1980 | Kavis | 180/287 |
| 4,300,057 | 11/1981 | Crosas | 180/287 |
| 4,446,950 | 5/1984 | Wise et al. | 180/287 |
| 4,471,852 | 9/1984 | Schield et al. | 180/287 |
| 4,546,846 | 10/1985 | Myers | 188/253 |
| 4,579,202 | 4/1986 | McIntosh | 180/287 |
| 4,595,903 | 6/1986 | Arlasky et al. | 180/289 |
| 4,682,062 | 7/1987 | Weinberger | 180/287 |
| 4,691,801 | 9/1987 | Mann et al. | 180/287 |

Primary Examiner—Kenneth R. Rice
Attorney, Agent, or Firm—Stanley R. Moore; Thomas L. Crisman

[57] ABSTRACT

A system for the prevention of theft of a motor vehicle comprising a valve system and electronic package for the control thereof. The valve system is connected between the master cylinder and the slave cylinder of the vehicle brake system and is selectively actuatable to cause the brakes of the vehicle to lock when the vehicle's ignition is turned off. The electronic package is connected to the valve system and the ignition system for generating an alarm system for generating an alarm system for selectively actuating the valve system. A keyboard is connected to the electronic package for controlling the operation thereof and means are provided for receiving a multi-digit code in the keyboard to effect actuation and deactuation of the valve system and the release of the vehicle brakes for operation of the vehicle. A series of separate alarm sensors are provided in conjunction with the electronic package for affording added safety and theft deterrence. In addition a manual override valve is incorporated into the system to facilitate emergency deactivation as well as disengagement of the system for vehicle repair and the like.

28 Claims, 3 Drawing Sheets

VEHICLE THEFT-PREVENTION SYSTEM

BACKGROUND OF THE INVENTION

The invention relates to a system for preventing the theft of motor vehicles and, more particularly, to a keyboard-controlled wheel/brake locking system, incorporating a one-way fluid flow network associated with deterrent alarms and a manual override valve.

HISTORY OF THE PRIOR ART

It is well known that the theft of motor vehicles has reached epidemic proportions in this country and around the world. Vehicles from the simplest, inexpensive family sedan to huge, enormously expensive tractor trailers are equally subject to misappropriation by highly skilled professional thieves. This is because, entering, starting, and driving away a motor vehicle is a very short and simple task for a professional thief. It rarely takes longer than thirty seconds for a thief of journeyman skills to gain entry to the vehicle and begin driving it away.

In an attempt to deter and/or prevent the theft of motor vehicles, many elaborate and sophisticated alarms schemes have been proposed. These schemes vary from concealed, key-operated arming devices providing an audible alarm upon entry into the vehicle to sophisticated vibration detectors and sonic actuated intrusion devices. However, the rapid assessing and disarming of such alarm systems is part of the standard operating procedure of a sophisticated car thief. Once the alarm is disabled, the thief simply drives the vehicle away.

Another approach to preventing motor vehicle theft is the use of means for locking the brakes of the vehicle. In this manner, even if a thief gains entry to the vehicle, it cannot be driven very far. These systems allow in some cases, the unauthorized starting of the vehicle. However, as soon as the brakes are applied for the first time, they then lock and the vehicle cannot be moved further until the system is disarmed. Many of these systems have incorporated special keys to actuate and deactuate the system from its locked condition. Examples of such systems are seen in U.S. Pat. No. 4,446,950 to Wise et al, and U.S. Pat. No. 2,826,390 to Bailey. U.S. Pat. No. 4,196,939 to Kavis also includes a special combination lock controlled valving mechanism. Similarly, U.S. Pat. No. 4,579,202 to MacIntosh and U.S. Pat. No. 2,695,685 to Jameson include special switches within the vehicle for actuating a brake-locking solenoid. Most of these devices utilize a one-way passage for brake fluid flowing from the master cylinder into the wheel cylinders. Special keys and switches are all relatively easy for a highly skilled car thief to locate and disable in order to override the system and spirit away the vehicle.

More sophisticated prior art systems are shown in U.S. Pat. No. 4,471,852 to Schield et al, and U.S. Pat. No. 4,546,846 to Myers. These systems include not only a one-way brake fluid locking system, but also certain other key-actuated alarm features within the system. Again, there are certain inherent disadvantages to key-actuating and switch control systems which are subject to override by experienced thieves.

The system of the present invention includes not only a novel arrangement for the locking of the brakes in a vehicle, but also the provision of a substantial number of other deterrent and alarm features for presenting a formidable barrier to a car thief. The system increases the time required for the thief to overcome the alarms and deterrents. More specifically, the means for enabling, disabling and programming the present system is an electronic keyboard control microprocessor system which is provided in a secured area within the vehicle. Even in the event that the wires leading to the keyboard are severed by a thief, the alarm and vehicle disablement of the present system are still effective.

SUMMARY OF THE INVENTION

The present invention includes a valve assembly incorporated within the hydraulic or pneumatic path between the master cylinder and the vehicle brakes. Certain of the control elements within the valving system are actuated in response to a solenoid which is controlled by the electronics package of the system. Both the electronics package, the solenoid, and the valving are incorporated into a secure lockbox on the vehicle. The electronics is actuated by a keyboard located on the console of the vehicle within easy reach of the driver.

In a further aspect, the invention also includes a programable means within the electronics whereby an operator must enter a certain code by means of the keypad in order to disable the brake-locking and/or alarms of the alarm component of the system. Further, the system includes a programable arming features whereby the vehicle may be left running. By means of the depression of a single digit, the brakes may also be locked temporarily and then unlocked again quickly for short periods of absence from the vehicle such as to run into a convenience store.

In a further aspect the invention includes means for preventing accidental engagement of the system when the vehicle is in motion. This could occur through the inadvertent depression of a correct code by a child, for example.

In yet a further aspect, the invention described above includes at leat one one-way valve and a solenoid valve in parallel flow relationship therewith, the solenoid valve having a normally closed position when not actuated for permitting closure once the ignition system of the vehicle is turned off therein allowing only one way flow of the hydraulic brake fluid to the slave cylinders. A manual flow valve may then be disposed in parallel flow communication with the solenoid valve providing manual override. The vehicle brake system may also include two master cylinders coupled to the slave cylinders.

In yet another aspect, the invention described above incorporates an electronic package including the keyboard being disposed on the driver area and coupled to the electronic package by cabling. The electronic packaging includes a horn and selectively actuated by the electronic package in response to an alarm signal. A siren alarm may also be disposed within the vehicle and coupled to the electronic package for actuation in response to an alarm signal. Additional features include a relay connected to the vehicle headlights and to the electronic package for actuation in response to an alarm signal generated thereby; a deadbolt and solenoid actuation system disposed to lock the vehicle trunk area in response to an alarm signal from the electronic package; a hood deadbolt coupled to the electronic package adapted for securing the hood in a locked position in response to an alarm generated by the electronic package; and a gas line solenoid valve coupled to the electronic package and adapted for interrupting the flow of gas in response to an alarm signal generated by the electronic package. Many other such safety and alarm features are described below.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION OF THE PRESENT INVENTION

Figure 1:
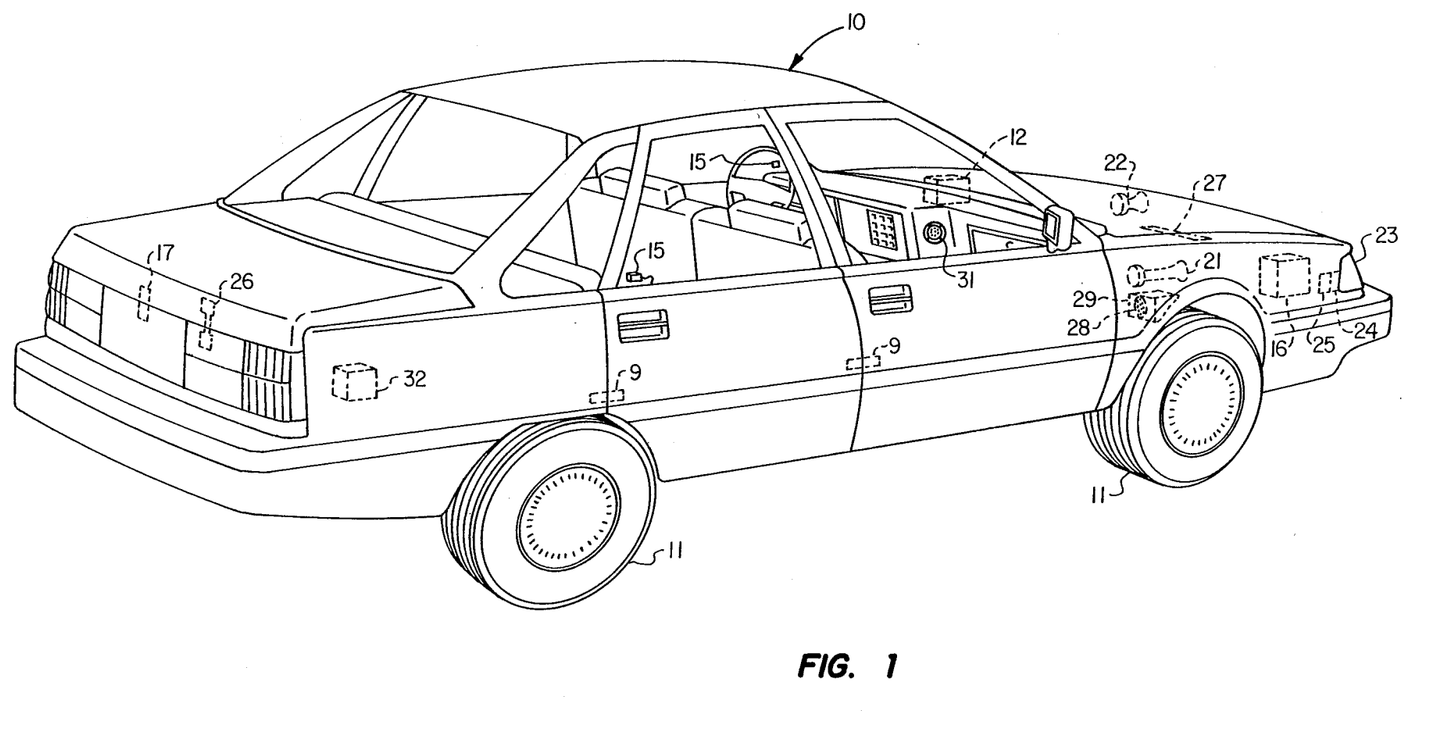
FIG. 1 is a perspective view of a motor vehicle incorporating the theft deterrent system of the present invention.

Referring first to FIG. 1, there is shown an automobile 10 which is equipped with the theft-deterrent system of the present invention. The automobile 10 includes four wheels 11 each one of which is connected to a hydraulically actuated brake system. When the brake pedal (not shown) within the car 10 is actuated, it operates at least one master cylinder (not shown in this Figure) which causes hydraulic fluid to move down the brake line. The brake fluid flow increases the fluid line pressure which actuates a slave cylinder assembled to the brake of each wheel 11 to retard its rotation. Continued depression of the brake pedal holds a relatively high pressure within the brake line and locks each of the wheels against rotation preventing movement of the vehicle from its location.

Included under the hood of the vehicle 10 of the present invention, is a secure lockbox 12. This structure contains the electronic circuitry, solenoid and valving of the system of the present invention to be described in more detail below. The electronics within the box 12 is connected by means of cabling to a keyboard 13 mounted on the dashboard of the vehicle within convenient access to the driver. The keypad 13 includes a standard 12-button array of keys including 10 digits, a "*", and a "#" symbol for actuation by the driver. In general, the system operates in a manner so that once it is enabled, and the vehicle ignition is turned off, a solenoid is released so as to prevent the flow of brake fluid through the valving system except from the master cylinder to the slave cylinder and then only through a one-way check valve. Thus, when the brakes are applied after the solenoid has been released, the brakes will become locked and the wheels 11 will no longer rotate. The vehicle thus cannot be moved until the brakes are unlocked. When the driver again enters the car, even if the ignition key is used, the solenoid valve will not actuate to unlock the valving and allow flow of the hydraulic fluid until a proper programmed code has been entered by means of the keypad 13 to cause the electronics within the box 12 to allow the solenoid to be actuated and restore normal operation of the brake system.

Other safety and deterrent features in the vehicle 10 of FIG. 1 include a standard horn 21 which is connected to a horn driver, in turn actuated by the system of the invention to serve as an alarm. In addition, a siren 22 is also located under the hood of the vehicle 10 for providing an audible alarm under certain conditions. The vehicle includes headlights 23 actuated by a headlight relay 24 under control of both the standard headlighting system of the vehicle, as well as a lights solenoid driver 25 actuated under the control of the anti-theft system of the present invention.

A trunk deadbolt system is provided to lock the trunk in a manner that totally disables its being opened in the absence of clearance of the alarm condition within the system. Similarly, a hood deadbolt 27 can also be locked by the system to prevent the opening of the hood of the vehicle. A gas line control solenoid 28 is actuated by the system to shut off the flow of fuel from the supply to the engine of the vehicle in an additional feature of the antitheft provisions of the system. The shut-off valve 29 operates, in connection with the gas solenoid driver 28, to shut off the flow of fuel to the engine of the vehicle.

Other optional features of the invention include a voice module speaker 31 which enables the efficient operating of the keyboard of the system with step-by-step instructions given by a preprogrammed optional module within the system to make it easy for anyone to use the system in the proper fashion. Additionally, a beeper transmitter 32 is located in the vehicle so that under certain alarm conditions as will be discussed below, the vehicle is capable of providing a signal to a beeper carried by the authorized owner/operator to notify him of conditions at the vehicle requiring his attention.

Figure 2:
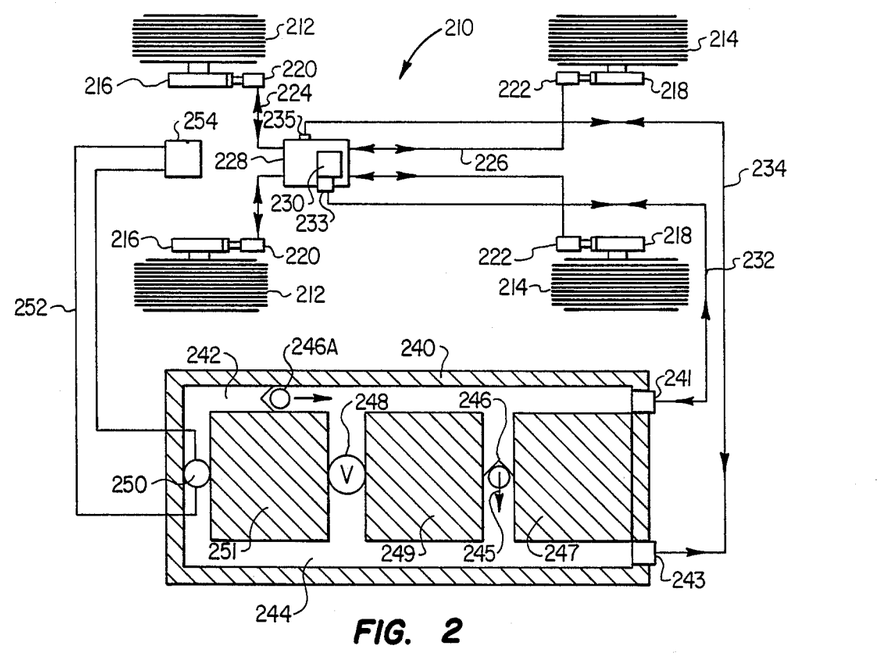
FIG. 2 is a diagramatic schematic of the positive lock anti-theft system for hydraulic brakes in accordance with the principles of the present invention.

Referring now to FIG. 2 there is shown a diagramatic schematic of the positive lock anti-theft system of the present invention installed in a vehicle 210. The vehicle 210 includes front wheels 212 and rear wheels 214. The front and rear wheels 212 and 214 include front and rear hydraulic brakes 216 and 218, respectively. The front and rear brakes 216 and 218 are assembled to front and rear brakes cylinders 220 and 222, respectively. Front brake cylinders 220 are coupled to front brake lines 224 while rear brake cylinders 222 are coupled to rear brake flow lines 226. Front and rear brake lines 224 and 226 are each coupled to a flow distributor 228 for the requisite passage of hydraulic brake fluid therethrough as is conventional in the prior art. At least one master cylinder 230 is coupled to the distributor 228 for actuation of front and rear brake lines 224 and 226, respectively, as described in more detail below. It should be noted that only one master cylinder is shown for purposes of illustration, but two may also be accommodated.

The flow of brake fluid within the front and rear brake lines 224 and 226 is illustrated herein by arrows depicting the direction of flow in each line. In the front and rear brake lines 224 and 226 the arrows appear in opposite directions on each line due to the fact that brake fluid is pumped both to the front and rear brake cylinders 220 and 222, respectively, and returned therefrom to the master cylinder 230 via the distributor 228. The flow through the distributor 228 is, in the present invention, controlled by secondary brakes lines 232 and 234 coupled thereto. The brake lines 232 and 234 provide a means for controlling the flow of brake fluid to and from the master cylinder 230 and the distributor 228 for providing the positive lock anti-theft system described herein. Brake line 232 comprises an input flow line flowing outwardly from master cylinder 230 and coupled thereto through port 233. Return line 234 affords flow into the distributor 228 through coupling port 235. Actuation of the master cylinder 230 then forces hydraulic brake fluid flow through input line 232 and output lines 234 as described in more detail below.

Still referring to FIG. 2, flow control lines 232 and 234 are coupled to a housing 240 comprising a positive lock hydraulic system comprising one embodiment of a positive lock hydraulic system constructed in accordance with the principles of the present invention. Input flow line 232 is coupled to housing 240 through input port 241 which feeds an input manifold side 242 comprising a cavity formed therein. Output line 234 is coupled to output port 243 of housing 240 in flow communication with output manifold 244 constructed as a flow cavity therein. Between input and output manifolds 242 and 244, respectively, are disposed three separate valves. Valve 246 comprises a one-way check valve secured between valve bulkheads 247 and 249. The check valve is of conventional design and installed to open in the direction of arrow 245 allowing fluid passage from intake manifold 242 to exhaust manifold 244 during normal operation. Once fluid passes from intake manifold 242 to output manifold 244 fluid is pumped down brake line 234 into the flow distributor 228 and into the front and rear brake lines 224 and 226. Because of the design of the check valve 246, fluid is not permitted to return between bulkheads 247 and 249. A manual valve 248 is disposed between bulkheads 249 and 251 to allow manual opening of the passage to permit return of brake fluid from exhaust manifold 244 into intake manifold 242 in emergency situations. Under normal operating conditions, solenoid valve 250 is open when the vehicle ignition is turned on. Without power to the solenoid valve 250 it remains closed to flow. This causes brake fluid to remain in front and rear brakes cylinders 220 and 222, respectively, when the brakes are actuated without the vehicle ignition turned on. A block diagram control 254 is thus shown adjacent the front wheels 212 and coupled to the solenoid valve 250 through control lines 252. The control unit 254 is addressed above as lock box 12 and described in more detail below. When the ignition is turned on and the proper signal registered in control unit 254, and solenoid is open to allow free flow between input and exhaust manifolds 242 and 244. This allows for normal operation of the vehicle brake systems. Only when the control unit 254 is turned off is the solenoid valve 250 in its normally closed mode, thereby preventing the front and rear brakes 216 and 218, respectively, the vehicle 210 to disengage once they have been activated through actuation of the master cylinder 230. The one-way check valve 246, in essence, operates from the master cylinder to the wheel cylinder to thereby eliminate theft except when the proper signal is generated by the control unit 254. An optional, second one-way check valve 246A may be utilized upstream of the solenoid valve 250, as shown, to prevent pressure from building up on the front side of the valve 250. In this way, all fluid flow from application of the brakes is forced through one-way valve 246.

Figure 3:
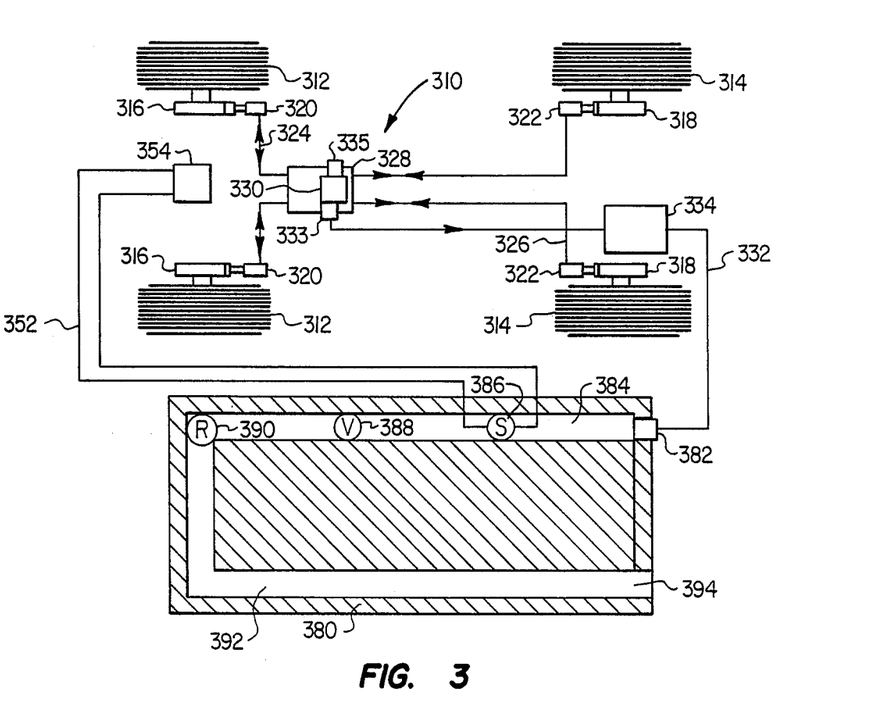
FIG. 3 is a diagramatic schematic of the positive lock anti-theft system for air brakes in accordance with the principles of the present invention.

Referring now to FIG. 3, there is shown a vehicle 310 constructed with a positive lock system for air brakes. The system is shown in a diagrammatic schematic very similar to that of FIG. 2 for purposes of reference. For example, front wheels 312 and 314 are shown assembled with front and rear brakes 316 and 318 having air brake cylinders 320 and 322 assembled thereto. The air brake cylinders 320 and 322 remain in the open position as long as air pressure is provided by the front and rear brake lines 324 and 216. When such air pressure is vented the front and rear brakes 316 and 318 are closed by a spring action preventing the vehicle 310 from moving forward. For this reason, the system of FIG. 3 works on the opposite flow as that described in FIG. 2. A master brake control and distributor 330 is shown for actuation of the brake system with the front and rear brake lines 324 and 326 assembled thereto. In opposition to FIG. 2, however, a venting orifice 335 is shown outwardly of the master brake control 330 and an air compressor 334 is shown supplying compressed air to brake line 332. As long as positive pressure is maintained within brake line 332 and front and rear brake lines 324 and 326, the front and rear brakes 316 and 318, respectively, remain open. Therefore, in the present embodiment, venting is the key to providing a positive lock for air brakes to prevent theft. For this reason, a controlled venting line 332 is shown coupled to the master brake control 330 at port 333. The air flow in line 332 is unit-directional and occurs only during venting occurring through the control housing 380. Venting line 332 enters control housing 380 at port 382 and into an input manifold 384. A solenoid 386 is provided in series with the manual valve 388 and a relief valve 390. The solenoid valve 386 is of the normally open poppet-type that is controlled by control unit 354 in the vehicle as coupled by control lines 352. When the ignition is activated and controller 354 is properly coded, the normally open poppet valve 386 is closed, preventing exhaust of air through vent line 392. For purposes of back-up and safety, manual valve 388 is provided. Manual valve 388 may be of the needle bypass variety, allowing a free flow to exhaust when open and preventing the operation of the housing 380 when closed. The relief valve 390 is disposed serially with valves 386 and 388 and is preselect for exhausting a threshold pressure on the order of 50 psi or the like. An exhaust manifold 392 is provided around the housing 380 for facilitating exhaust of compressed air through exhaust port 394 disposed on one end thereof. It should be noted that this diagram and the operation thereof is shown for purposes of illustration only. A myriad of valve and flow diagram configurations could be incorporated in accordance with the principles of the present invention.

Figure 4:
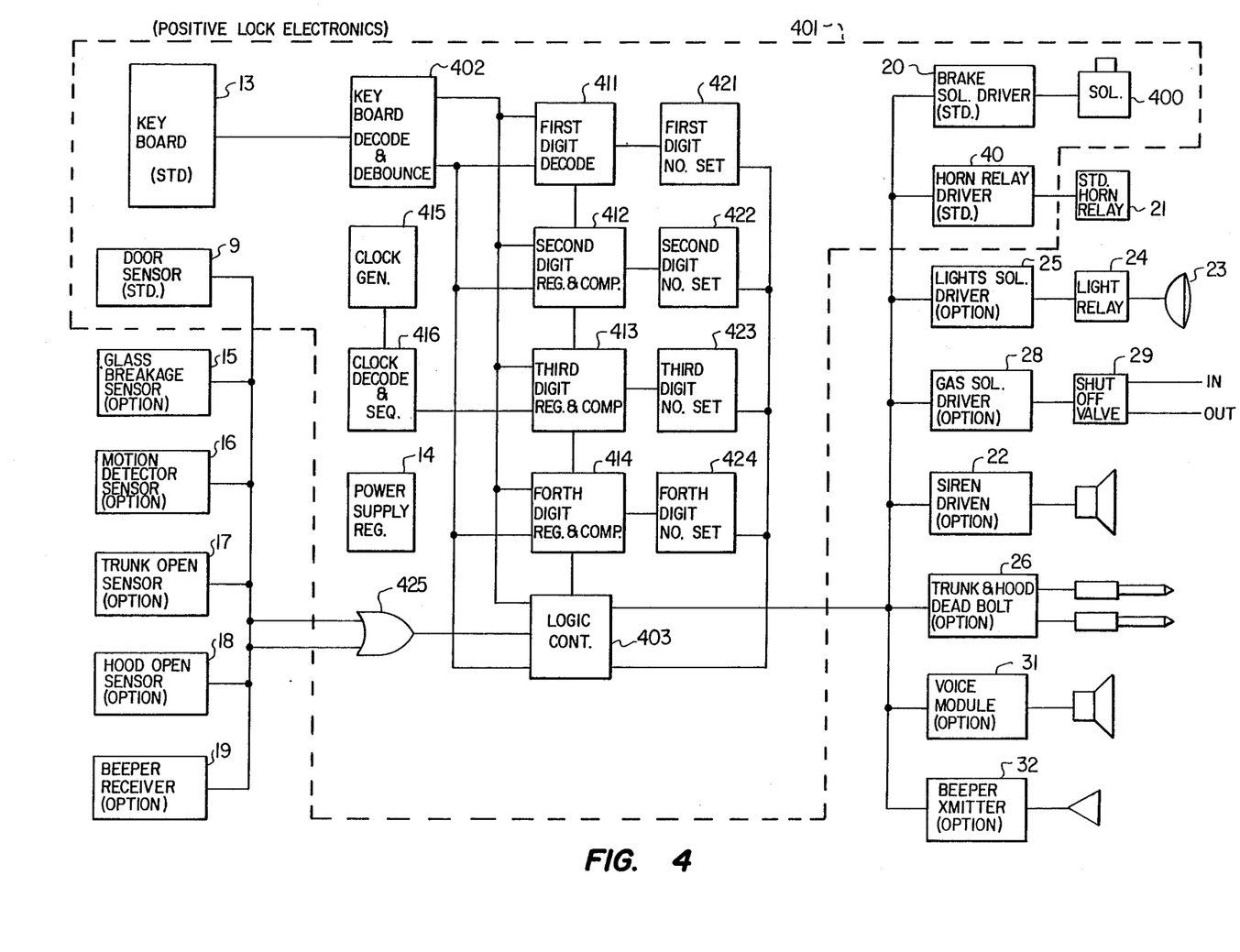
FIG. 4 is a block diagram of the electronic and control circuitry of the system of the present invention.

Referring now to FIG. 4, there is shown a block diagram of the electronic control for the system of the present invention. The portion of the circuitry within the dotted enclosure 401 comprises the basic standard operating features of the electronics of the system of the present invention. The other additional components are, generally speaking, considered to be options to the system of the present invention.

The keyboard 13 is connected to a keyboard decoder and debounce circuit 402, the output of which is connected into the logic control module 403 as well as to the individual digit decoders 411, 412, 413 and 414. The decoder 411 is responsible for decoding of the first digit of a four digit code, the decoder 412 is responsible for the second digit and includes a register and comparator. Therefore, the third digit register and comparator 413 is responsible for the third digit, while 414 is a register and comparator responsible for recognition of the fourth digit. A clock generator 415 is connected through a clock decoder and sequencer unit 416 into the digit decoders 411–414. The regulator 14 supplies control voltage to the entire circuitry. The output of each of the respective digit decoders 411–414 is connected through a plurality of digit combination set circuits 421–424 for each of the respective four digits for gaining access to unlock the circuit. Each of these register 421–424 may be selectively programmed by means of entry of data into the keyboard 13 via the logic circuitry 403.

A plurality of sensors 9 and 15–19 are connected through an orgate 425 into the logic circuitry 403. The control output of the logic circuit 403 is connected to each one of a plurality of discreet drivers which will serve a number of functions within the system. First, the sensors providing input to the logic circuitry include the door sensor 9 which provides the signal through the orgate 425 upon the opening of any door to the vehicle. The glass breakage sensor 15 provides a signal in the event that there is any glass broken or disturbed on the vehicle. The motion detector sensor 16 provides a signal in the event that the vehicle is moved or vibrated so as to trigger the motion detector. The trunk open sensor 17 provides a signal through the orgate 425 to the logic 403 in the event that the trunk is opened. Similarly, the hood open sensor 18 provides a signal through the OR gate 425 upon opening the hood. A beeper receiver 19 is provided to receive a signal from a standard beeper in the event the signal transmission via standard telephone circuitry to trigger certain functions within the present system.

At the output of the logic circuitry 403 are a plurality of solenoid drivers, including the primary brake solenoid driver 20, which, upon actuation of the driver operates the solenoid 400 to provide for the passage of hydraulic brake fluid from the master cylinder as described above relative to FIG. 2. This causes the locking of the brakes upon depression of the brake pedal. The horn driver relay 40 triggers the operation of the standard horn relay 21 to allow the sounding of the vehicle horn to provide a antitheft effect, calling notice to the vehicle in response to operation of the system.

The lights solenoid driver 25 operated by the microprocessor 403 of the system actuates the light relay 24 and controls the lumination of the vehicle lights 23 so that, again, attention is drawn to the vehicle in the event of an alarm condition. A gas solenoid driver 28 provides, upon actuation, the control of a gas shut-off valve 29 to disable the flow of gas from the supply to the vehicle engine in the event that the system so designates. The siren driver 22 operates a loud siren as an additional warning device to deter the operation of a thief.

The trunk deadbolt solenoid driver 26 effectively operates the deadbolts within the trunk and hook to prevent the opening of either one of them upon the actuation by the system. A voice module 31 is provided and operated by the microprocessor logic 403 to provide operating instructions to the one one will be operating the system to simplify it for certain individuals. Finally, a beeper transmitter 32 is capable of providing a signal to a receiver and notifying, by means of that receiver, that an alarm condition exists at the vehicle.

The keyboard 13 serves as the interface of the device with the operator and its principle function is to allow the input of a four digit combination to the electronic controls of the system for various purposes, including setting up the operation modes of the system, setting of the combination numbers within the systems, and setting up various time periods within which the system operates. As numbers are inputted into the keyboard 13 by an operator, they are decoded and debounced by the keyboard decoder and debounce circuitry 402 and used to drive the digit decoders 411–414. Upon entry of the first digit, the first digit decoder 411 checks the data for the first digit of the combination. A first digit may consist of any number from zero to nine, and its entry initializes the register and comparator circuits in the second, third and fourth digit circuitries 411–414. In addition, the first digit decoder also enables the clock decode sequencing circuit 415 to begin operation. Each digit in the system may be set from zero to nine, however, the first digit, or whichever one is selected, cannot be repeated within the other three digits of the combination for certain purposes.

As the digits are keyed into the keyboard 13, the clock decoder and sequencer 415 strobes the data from the keyboard decoder and debounce circuit 402 into the register/comparators 412–414. The numbers are compared with numbers which are previously stored in the combination set circuits 421–445. After the fourth digit has been keyed in, the logic control circuit 403 will be actuated by a successful comparison of the encoded digits to energize the brake solenoid driver 20, actuating the solenoid 400 and releasing the brakes from their locked condition. The brakes may be locked at any time by keying in only the first digit. This is a feature of the system which allows a vehicle to be left running without the fear of someone driving it off or children accidentally putting the automobile into gear and moving it into a position so as to cause an accident. Once the brakes have been locked, the vehicle cannot be moved for a substantial time period, unless they are unlocked due to the leakage of fluid within the anti-theft system. The system includes a feature so that an alarm condition is activated automatically when the automobile has been turned off and the doors have been opened and closed following the elapse of a preselected time period. The time period for the alarm to become active may be incoded by means of the keyboard 13. The alarm setting may also be disabled by means of the keyboard 13 upon the entry of the proper code. The alarm is armed whenever the driver leaves the vehicle and closes the doors. Once the door is again opened and closed and the proper code is not entered into the keyboard within a preselected time period, then an alarm condition exists and the horn relay driver 40 is energized by the logic circuitry 403 to sound the horn 21 and indicate an alarm condition to people in the area. The time period before the alarm goes off and also the time period for the alarm condition to remain is programmable by means of the keyboard 13. The clock generator circuit 415 provides clock pulses for timing and control of the logic and control circuitry 403 for the system.

The system of the present invention also includes several distinct features which facilitate the usage of the system of the present invention. In particular, a child-proofing mode is provided, as well as a combination disabling mode for certain situations. The child-proofing mode is incorporated in the form of the requirement that a "*" or "#" key must be depressed at the same time as the first digit is entered into the system in order to have the system accept it. This mode prevents the circuitry from deactivating the brake solenoid any time the first digit is entered by itself. As set forth above, deactivating the brake solenoid allows the brake to lock as soon as they are applied by the operator. The feature of having the solenoid disabled by the entry of a single digit greatly facilitates the use of the present system so that in the event a driver is stopping at a location to run in for only a few minutes and wants to leave the car running, be may simply depress the first digit, lock the brakes down, and anyone who sought to drive the car off would be unable to do so without knowing the proper combination to unlock the system. This single digit actuation of the system might be potentially hazardous with children in the car in the event that they could inadvertently depress the digit by themselves so that the next time the driver applied the brakes, a hazardous condition might occur. The child-proofing means of requiring the depression of a special key at the same time as the single digit removes this hazardous possibility.

Further, vehicle must periodically be taken to a garage for service. When this occurs, the system of the present invention might produce a slight difficulty in the event that the repair persons at the garage would have to be given the multi-digit code in order for them to move the vehicle about in the shop, and thus compromise some of the security of the code. For this reason, the system includes a combination disable mode which allows the vehicle to be taken for service without giving the service persons the combination to the system. In this mode, the system controls the brakes only by means of the ignition switch. That is, in the event that the ignition is off, the brakes are locked. When the ignition is on, then the brakes are unlocked.

The circuitry of the system invention incorporate a number of options which are incorporated in order to improve the security of the system, as described above. In particular: glass breakage, motion detections, trunk open and hood open sensors are connected into the logic to detect any forcible entry into the vehicle. In addition, a microwave receiver may be connected to activate or deactivate the alarm system under desired conditions.

Similarly, a plurality of warning devices may be connected to the output of the microprocessor 403 of the system. For example, the system can flash the vehicle's lights, shut off the gas, sound the siren, or transmit by means of a beeper to warn the owner of the vehicle that an alarm condition exists. Similarly, the option of a voice module can also be provided to assist in the operation of the system. The voice module adds a user-friendliness aspect of the system and can lead a person through each step of setting the combination, configuring the operation, the time constraints within the system, and issue warnings to the operator as is necessary to achieve the adequate and full operation of the system as is contemplated.

As set forth above, the system of the present invention provides a number of basic configurations which aid in the prevention and/or deterrent of the theft of the vehicle. In addition, they provide certain aspects of flexibility and ease in operation heretofore not found in the prior art systems for locking the brake in order to prevent the theft of the vehicle. In particular, the keyboard actuated electronics of the system provide an enhanced and relatively sophisticated and flexible means of implementing the system of the present invention.

It will be understood that foregoing description of preferred embodiments of the present invention is for purpose of illustration only, and that various structures and operational features herein disclosed are susceptible to a number of modifications and changes, none of which entails any departure from the spirit and scope of the present invention as defined in heretofore appended claims.

What is claimed is:

1. A system for the prevention of theft of a motor vehicle having doors, an engine, a driver area, an ignition system and an hydraulic brake system including at least one master cylinder, at least one slave cylinder, and a network of hydraulic fluid-flow lines coupled to said brakes, said brake system being capable of locking the wheels of the vehicle in response to the application of pressure within said brake system and the maintenance of said pressure upon said slave cylinder, said theft prevention system comprising:

a valve system connected between said master cylinder and said slave cylinder of said vehicle, said valve system being selectively actuatable to allow passage of fluid only from said master cylinder to said slave cylinder for creating pressure and engaging said brakes and maintaining said pressure thereon;

an electronic package connected to said valve system and said ignition system for generating an alarm signal for selectively actuating said valve system;

a keyboard connected to said electronic package for controlling the operation thereof, including means for receiving multi-digit code in said keyboard to effect de-actuation of said valve system and the release of said brakes for the operation of said vehicle;

said valve system including at least one one way valve and a remotely actuatable solenoid valve in parallel flow relationship therewith and coupled to said electronic package, said solenoid valve having a normally closed position when not remotely actuated by said electronic package for permitting closure once said ignition system of said vehicle is turned off therein allowing only one-way flow of said hydraulic fluid to said slave cylinder; and a manual fluid flow valve disposed in parallel flow communication with said solenoid valve for facilitating the select bypass thereof by manual operation and disabling said system.

2. The apparatus as set forth in claim 1 wherein said vehicle further includes a trunk and said electronic package includes a deadbolt and solenoid actuation system disposed to lock said trunk area in response to an alarm signal from said electronic package.

3. The apparatus as set forth in claim 1 wherein said vehicle further includes a hood disposed over said engine and said electronic package includes a hood deadbolt coupled to said electronic package adapted for securing said hood in a locked position in response to an alarm generated by said electronic package.

4. The apparatus as set forth in claim 1 wherein said vehicle further includes a gas line and said electronic package includes a gas line solenoid valve coupled to said electronic package and adapted for interrupting the flow of gas in response to an alarm signal generated by said electronic package.

5. The apparatus as set forth in claim 1 wherein said vehicle brake system includes at least two master cylinders coupled to a plurality of slave cylinders.

6. The apparatus as set forth in claim 1 and further including a check valve disposed in series flow communication with said solenoid valve to prevent fluid pressure on said upstream side of said solenoid valve during actuation of pressure within said brake system.

7. The apparatus as set forth in claim 1 wherein said electronic package is disposed in said engine area and includes said keyboard being disposed in said driver area and coupled to said electronic package by electrical cabling.

8. The apparatus as set forth in claim 1 and further including a horn disposed within said vehicle and said electronic packaging including a horn driver connected to said vehicle horn and selectively actuated by said electronic package in response to said alarm signal.

9. The apparatus as set forth in claim 1 and further including a siren alarm unit disposed within said vehicle and coupled to said electronic package for actuation thereof in response to an alarm signal therefrom.

10. The apparatus as set forth in claim 1 wherein said vehicle further includes headlights and said electronic package includes a relay connected to said headlights and to said electronic package for actuation in response to an alarm signal generated thereby.

11. The apparatus as set forth in claim 1 wherein said electronic package includes a solenoid driver for said remotely actuatable solenoid valve, logic circuitry and one or more alarm sensors, said logic circuitry being adapted for detecting sensor alarm signals from said alarm sensors and producing an alarm signal to said solenoid drivers.

12. The apparatus as set forth in claim 11 wherein said vehicle includes a trunk and trunk lid and said electronic package further includes a trunk lid sensor connected to said logic circuit for generating a sensor alarm signal in the event of movement of said trunk lid.

13. The apparatus as set forth in claim 11 wherein said vehicle further includes a hood covering said engine and said electronic package further includes a hood sensor connected to said logic circuit for generating a sensor alarm signal in the event of movement of said hood.

14. The apparatus as set forth in claim 11 wherein said electronic package further includes a door sensor connected to said logic circuit for generating a sensor alarm signal in the event of movement of one of said doors.

15. The apparatus as set forth in claim 11 wherein said solenoid driver is coupled to said solenoid valve of said valve system and connected to said logic circuit for receiving a sensor alarm signal and activating said brake locking system.

16. The apparatus as set forth in claim 11 wherein said vehicle is constructed with glass windows and said system further includes at least one glass breakage sensor disposed adjacent at least one of said windows and coupled to said electronic package.

17. The apparatus as set forth in claim 11 wherein said electronic package further includes a motion sensor connected to said logic circuit for generating a sensor alarm signal in response to motion of said vehicle.

18. A system for the prevention of theft of a motor vehicle having an engine, a driver area, an ignition system, and a pneumatic brake system including at least one master brake control and at least one slave cylinder coupled to said brakes, said pneumatic brake system being capable of locking the wheels of the vehicle in response to the loss of pressure within said brake system, said theft prevention system comprising:

a valve system connected between said master brake control and said slave cylinder of said vehicle, said valve system being selectively actuatable to vent said brake line causing actuation of said slave cylinder for engaging said brakes and maintaining said brake engagement in said vehicle;

an electronic package connected to said valve system and said ignition system for generating an alarm signal for selectively actuating said valve system;

a keyboard connected to said electronic package for controlling the operation thereof, including means for receiving a multi-digit code in said keyboard to effect closure of said venting for the release of said breaks in the operation of said vehicle;

said pneumatic brake system including an air pressure source and a network of air lines disposed between said master brake control and said brakes;

said valve system including at least one solenoid valve in series flow relationship with said air pressure source, said solenoid valve being remotely actuatable and coupled to said electronic package, said solenoid valve further having a normally open position when not remotely actuated by said electronic package for permitting open when said ignition system of said vehicles is turned off therein allowing the venting of said pneumatic brakes lines; and further including a manual pneumatic flow valve disposed in flow communication with said solenoid valve for facilitating the select by-pass thereof by manual operation and disabling of said system.

19. The apparatus set forth in claim 18 and further including a pressure relief valve disposed in flow communication with said solenoid valve to permit the release of pressure therefrom in excess of a preselect limit.

20. The apparatus set forth in claim 18 wherein said electronic package is disposed in said engine area and includes said keyboard being disposed in said driver area and coupling said electronic package by electronic cabling permitting the control and the operation thereof.

21. The apparatus set forth in claim 18 and further including a horn disposed within said vehicle and said electronic packaging including a horn driver connected to said vehicle horn and being selectively actuatable by said electronic package in response to said alarm signal therefrom.

22. A system for the prevention of theft of a motor vehicle having doors, an engine, a driver area, an ignition system and an hydraulic brake system including at least one master cylinder, at least one slave cylinder, and a network of hydraulic fluid flow lines coupled to said brakes, said brake system being capable of locking the wheels of the vehicle in response to the application of pressure within said brake system and the maintenance of said pressure upon said slave cylinder, said theft prevention system comprising:

a valve system connected between said master cylinder and said slave cylinder of said vehicle, said valve system being selectively actuatable to allow passage of fluid only from said master cylinder to said slave cylinder for creating pressure and engaging said brakes and maintaining said pressure thereon;

an electronic package connected to said valve system and said ignition system for generating an alarm signal for selectively actuating said valve system;

a keyboard connected to said electronic package for controlling the operation thereof, including means for receiving multi-digit code in said keyboard to effect deactuation of said valve system and the release of said brakes for the operation of said vehicle; and said keyboard including means for preventing accidental engagement of said valve system while said vehicle is in motion.

23. A method for the prevention of theft of a motor vehicle having doors, an engine, a driver area, an ignition system and an hydraulic brake system including at least one master cylinder and at least one slave cylinder coupled to said brakes, said brake system being capable of locking the wheels of the vehicle in response to the application of hydraulic pressure within said brake system and the maintenance of said pressure upon said slave cylinder, said method comprising the steps of:

providing a valve system having at least one one-way valve for selectively permitting the one-way flow of hydraulic fluid therethrough;

disposing said valve system between said master cylinder and said slave cylinder of said vehicle;

selectively actuating said valve system to allow passage of hydraulic fluid only from said master cylinder to said slave cylinder for creating pressure therein and engaging said brakes and maintaining said pressure thereon;

providing an electronic package for generating an alarm signal for selectively actuating said valve system;

connecting said electronic package to said valve system;

providing a keyboard for controlling the operation of said electronic package;

connecting said keyboard to said electronic package;

providing means for receiving a multi-digit code in said keyboard to effect the actuation of said valve system and the release of said brakes for the operation of said vehicle; and programming said electronic package in conjunction with said keyboard for receiving a select code for the actuation of said system for preventing the accidental engagement of said valve system while said vehicle is in motion.

24. A method for the prevention of theft of a motor vehicle having doors, an engine, a driver area, an ignition system and an hydraulic brake system including at least one master cylinder and at least one slave cylinder coupled to said brakes, said brake system being capable of locking the wheels of the vehicle in response to the application of hydraulic pressure within said brake system and the maintenance of said pressure upon said slave cylinder, said method comprising the steps of:

providing a valve system having at least one one-way valve for selectively permitting the one-way flow of hydraulic fluid therethrough;

disposing said valve system between said master cylinder and said slave cylinder of said vehicle;

selectively actuating said valve system to allow passage of hydraulic fluid only from said master cylinder to said slave cylinder for creating pressure therein and engaging said brakes and maintaining said pressure thereon;

providing an electronic package for generating an alarm signal for selectively actuating said valve system;

connecting said electronic package to said valve system;

providing a keyboard for controlling the operation of said electronic package;

connecting said keyboard to said electronic package;

providing means for receiving a multi-digit code in said keyboard to effect the actuation of said valve system and the release of said brakes for the operation of said vehicle;

said method further including the steps of coupling a network of hydraulic fluid flow lines between said master cylinder and said brakes with said one-way valve disposed therein, providing a remotely actuable solenoid valve, disposing said solenoid valve in parallel flow relationship with said one-way valve, coupling said remotely actuatable solenoid valve to said electronic package, closing said solenoid in response to said ignition system of said vehicle being turned off, and imparting one-way flow of hydraulic fluid to said slave cylinders; and further including the step of providing a manual flow valve and coupling said manual flow valve in parallel flow communication with said solenoid valve for facilitating the select by-pass thereof.

25. The method as set forth in claim 24 and further including the step of providing a horn and horn driver and connecting said horn and horn driver to said vehicle and said electronic packaging for the select actuation thereof by said electronic package in response to said alarm signal.

26. The method as set forth in claim 24 wherein said vehicle includes a gas line and said method includes the steps of providing a gas line solenoid and coupling said solenoid to said gas line and to said electronic package for interrupting the flow gas in response to an alarm signal generated by said electronic package.

27. The method as set forth in claim 24 and further including the steps of providing at least one alarm sensor and coupling said alarm sensor to said vehicle and to said electronic package for generating an alarm sensor signal in response to certain movement on said vehicle.

28. The method as set forth in claim 27 wherein said alarm sensor comprises a door sensor and said method includes the step of connecting said door sensor to said electronic package for generating an alarm signal in the event of movement of said doors.

* * * * *